United States Patent [19]

Baird

[11] Patent Number: 5,448,001
[45] Date of Patent: Sep. 5, 1995

[54] POLYMERIZATION OF ISO-BUTYLENE

[75] Inventor: Michael C. Baird, Kingston, Canada

[73] Assignee: Queen's University at Kingston, Kingston, Canada

[21] Appl. No.: 319,708

[22] Filed: Oct. 7, 1994

[51] Int. Cl.$^6$ .................. C08F 4/649; C08F 4/643; C08F 10/10

[52] U.S. Cl. .................. 526/134; 526/131; 526/170; 526/339; 526/348.7

[58] Field of Search .................. 526/134, 348.7, 339, 526/170, 131

[56] References Cited

U.S. PATENT DOCUMENTS 5,272,236 12/1993 Lai et al. .................. 526/348.6 X
5,296,433 3/1994 Siedle et al. .................. 526/134 X

OTHER PUBLICATIONS

Pellecchia et al. (1992) Makromol. Chem., Rapid Commun., 13, 265–268.

Primary Examiner—Fred Teskin
Attorney, Agent, or Firm—Richard J. Hicks

[57] ABSTRACT

Iso-butylene based polymers and particularly butyl rubber may be polymerised from iso-butylene or iso-butylene/isoprene mixtures respectively using a metallocene type catalyst. In particular, polymerization or co-polymerization takes place very rapidly under anhydrous and anaerboic conditions at temperatures between $-100°$ C. and $-20°$ C. in the presence an initiator co-initiator system comprising Cp'MXX'X''/BRR'R'' in an organic solvent such as toluene, where Cp' is a $\pi$-bonded cyclopentadienyl or substituted cyclopentadienyl ligand; M is selected from titanium, zirconium and hafnium; XX' and X'' are the same or different anionic groups containing 1–20 non-hydrogen groups; B is boron; and R, R' and R'' are the same or different anionic groups containing 1–30 non-hydrogen groups.

15 Claims, No Drawings

POLYMERIZATION OF ISO-BUTYLENE

FIELD OF INVENTION

This invention relates to the production of poly iso-butylene based polymers and in particular butyl rubber, using a metallocene type polymerization catalyst.

BACKGROUND OF INVENTION

Conventionally, butyl rubbers are produced by copolymerization of isobutylene and isoprene at cryogenic temperatures (~ −90° C.) using an aqueous aluminum trichloride initiator and chlorinated hydrocarbon solvents. Operating at cryogenic temperatures is expensive, it is difficult and expensive to remove all of the water and chlorine introduced with the initiator and the chlorinated hydrocarbon solvents represent a considerable environmental hazard. There is a need, therefore, for a less expensive and more environmentally friendly process for preparing iso-butylene based polymers and particularly butyl rubber.

As used herein the term iso-butylene based polymers includes polymers ranging from 100% polyisobutylene to polymers containing 50% polyisobutylene with up to 50% isoprene or other related comohomers such as chloroprene.

The titanium-based olefin polymerization initiator Cp*TiMe$_3$ where Cp*=$\eta^5$-pentamethylcyclopentadienyl, activated with tris(pentafluorophenyl)boron, B(C$_6$F$_5$)$_3$, in a toluene solvent has been investigated in detail by the present inventor and co-workers (J.Am. Chem. Soc., 115, 2543–2545 (1993) and has been used in earlier work to produce syndiotactic polystyrene (see commonly assigned previous U.S. patent application 08/108,968 filed 19 Aug. 1993, and Macromol. Chem. Rapid Commun. 13, 265–268 (1992)). In the latter paper, as well as in publications describing olefin polymerizations by similar compounds (J. Polymer Sci.: Part A 27, 1539–1557 (1989); Polymer Sci.: Part A 29, 1253–1263 (1991); Organometallics, 12, 3075 (1993)), it has been widely assumed that the mode of olefin polymerization in all cases involves the coordination insertion, or Ziegler-Natta mechanism. In this now classic mode of olefin polymerization, the olefin monomer binds to a catalyst site on the metal complex containing the growing polymer chain and the latter migrates to the bound monomer, thus generating a polymer chain lengthened by two carbon atoms.

Noting apparent inconsistencies between relative rates of polymerizations of various olefins by the Cp*TiMe$_3$-B(C$_6$F$_5$)$_3$ initiator system and reactivity patterns anticipated for Ziegler-Natta polymerization, an hypothesis is now proposed which is totally without precedent, that the Cp*TiMe$_3$-B(C$_6$F$_5$)$_3$ initiator system can behave as a carbocationic polymerization initiator with olefins susceptible to carbocationic polymerization, such as vinyl ethers and N-vinylcarbazole (see commonly assigned U.S. patent application 08/251,989 filed 1 Jun. 1994, and J. Am. Chem. Soc., 116, 6435–6436 (1994)). Concurrent with these discoveries, it has been found that the above-mentioned initiator/co-initiator system is effective in non-aqueous solvents and over the temperature range −20° to −110° C. for the polymerization of isobutylene, which is not generally known to be polymerized by organotransition metal compounds, and for the copolymerization of iso-butylene with various dienes such as isoprene (to produce butyl rubber). This invention provides a more economically favourable (higher possible reactor temperatures) and more environmentally benign (avoids use of chlorinated hydrocarbon solvent) process than that currently utilized (Encyclopedia of Polymer Science and Technology, vol. 8, 427–436, 546–547 (1987)) for the manufacture of butyl rubber, and provides a framework for the reconsideration of other potentially useful transition metal compounds for the formation of iso-butylene homo- and copolymers.

OBJECT OF INVENTION

Thus, it is an object of the present invention to provide an improved process for the production of iso-butylene based polymers.

A preferred object of this invention is to provide a process for copolymerizing isobutylene and isoprene or related comonomer so as to produce butyl rubber.

BRIEF STATEMENT OF INVENTION

By one aspect of this invention there is provided a process for producing iso-butylene based polymers comprising: polymerizing iso-butylene in the presence of at least 10$^{-5}$ mol/L of an initiator system comprising compounds of the type Cp'MXX'X", and compounds of the type BRR'R", where Cp' is a $\pi$-bonded cyclopentadienyl or substituted cyclopentadienyl ligand, M is selected from the group consisting of titanium, zirconium and hafnium, X, X' and X" are the same or different anionic groups containing 1 to 20 nonhydrogen atoms, B is boron, and R, R' and R" are the same or different artionic groups containing 1 to 30 nonhydrogen atoms, under anhydrous conditions at a temperature in the range from about −100° C. to about −20° C.

By a preferred aspect of this invention there is provided a process for producing butyl rubber comprising: copolymerizing selected proportions of isobutylene and isoprene in the presence of at least 10$^{-5}$ mol/L of an initiator co-initiator system comprising compounds of the type Cp'MXX'X", and compounds of the type BRR'R", where Cp' is a $\pi$-bonded cyclopentadienyl or substituted cyclopentadienyl ligand, M is selected from the group consisting of titanium, zirconlure and hafnium, X, X' and X" are the same or different anionic ligands containing 1 to 20 nonhydrogen atoms, B is boron, and R, R' and R" are the same or different anionic groups containing 1 to 30 nonhydrogen atoms, under anhydrous conditions at a temperature in the range from about −100° C. to about −20° C.

DETAILED DESCRIPTION OF PREFERRED EMBODIMENTS

Metallocene-alumoxane catalysts are well known for polymerization of olefins and are more versatile than the traditional Ziegler-Natta type catalysts. However, they are expensive, air sensitive and difficult to manipulate. Other polymerization catalyst initiator systems based on a monocyclopentadienyl or substituted monocyclo-pentadienyl metal complex containing a compound of the type Cp'MXX'M", where Cp' is a $\pi$-bonded cyclopentadienyl or substituted cyclopentadienyl ligand, preferably a $\eta^5$-pentamethylcyclopentadienyl group, covalently $\pi$-bonded to M, M is selected from the group consisting of titanium, zirconium and hafnium, X, X' and X" are the same or different anionic ligands containing 1 to 20 nonhydrogen atoms, activated with a borane co-initiator of the type BRR'R", where R is boron, and R, R' and R" are the same or different artionic groups containing 1 to 30 nonhydrogen atoms, have also been described in the open literature and found to be effective for polymerization of many α-olefinic compounds. The initiator/co-initiator in a 1:1 molar ratio is generally dissolved in an organic solvent such as toluene or methylene dichloride, but other organic solvents such as ethyl ether and hexane may be used.

It has now been found that an initiator system comprising compounds of the type Cp'MXX'X", and a co-initiator system of the type BRR'R", where Cp' is a π-bonded cyclopentadienyl or substituted cyclopentadienyl ligand, covalently bonded to M, where M is selected from the group consisting of titanium, zirconium and hafnium and hafnium, X, X' and X" are the same or different anionic ligands containing 1 to 20 nonhydrogen atoms, B is boron, and R, R' and R" are the same or different anionic groups containing 1 to 30 nonhydrogen atoms, can also be used to polymerize iso-butylene and mixtures thereof with isoprene or other related co-monomers thereof in amounts up to about 50% generally, but not essentially the initiator and co-initiator are mixed in equal molar ratio. Preferably Cp' is a $\eta^5$-pentamethylcyclopentadienyl group; M is titanium; X, X' and X" are selected from the group consisting of alkyl, alkoxy, carboxy ($C_1$-$C_{10}$) aryl ($C_6$-$C_{20}$) and halo and R, R' and R" are selected from haloaryl and substituted haloaryl ($C_6$-$C_{20}$). In a most preferred embodiment M is titanium; X, X' and X" are methyl; and R, R' and R" are pentafluorophenyl. Depending upon the impurity levels in the solvents and equipment, initiator system concentrations as low as $10^{-5}$ mol/L of solvent can be used. Ideal conditions are, however, rarely achieved and/co-initiator concentrations of about $10^{-3}$ mol/L are often required to achieve satisfactory formation of iso-butylene containing polymer. Monomer/initiator ratios of at least 500:1 and preferably higher may be used. Ratios up to 1700:1 have been used successfully. Both monomer/initiator ratio and temperature influence the molecular weight of the polymer produced as described in more detail hereinbelow.

PRODUCTION OF POLYISOBUTYLENE

It has been found that anhydrous conditions were necessary and all reactions were carried out under a dry nitrogen atmosphere. The iso-butylene was dried by passing over 4 Å molecular sieves.

The amount of iso-butylene monomer used was determined by measuring the volume of condensed monomer in the reaction flask. Polymerization was initiated by the addition of $0.06 \times 10^{-3}$ mol of initiator/co-initiator (Cp*TiMe$_3$ dissolved in 1 mL of the selected solvent, the B(C$_6$F$_5$)$_3$ in 2 mL of the selected solvent). After a short time, usually one to five minutes, the polymer formed was already insoluble and separated as a sticky, solid precipitate. When possible, the stirring of the almost heterogeneous reaction mixture was maintained for another twenty minutes.

The polymerizations were terminated by addition of 1% HCl in methanol and the polymer was washed with methanol and dried. Purification of the polymer was effected by precipitation from hexane or CH$_2$Cl$_2$ solutions with methanol and, in some cases, by dissolving the polymer in hexane and passing it through a silica column; the product was then dried at 60° C. for 24 hours. Some low molecular weight ($\sim 10^3$ g/mol) fraction of poly(iso-butylene) was found soluble in large volumes of methanol.

It has also been found that the weight average molecular weight, $M_w$, of the poly(iso-butylene) increases with decreasing temperature and that the $M_w$ is influenced by the polarity of the solvent and the heterogeneity of the system as noted in Table 1 below. It is believed that this is because high $M_w$ poly isobutylene is formed rapidly and precipitates as a white solid which is soluble in methylene chloride but insoluble in methanol.

TABLE 1

| Exp No. | Solvent | $M_w$ | $M_w/M_n$ | Temp |
|---|---|---|---|---|
| 1 | CH$_2$Cl$_2$ | $1.3 \times 10^4$ | 2.7 | −20° C. |
| 2 | CH$_2$Cl$_2$ | $3.4 \times 10^4$ | 2.2 | −70° C. |
| 3 | CH$_2$Cl$_2$ | $7.6 \times 10^4$ | 2.1 | −78° C. |
| 4 | Toluene | $3.1 \times 10^4$ | 2.1 | −20° C. |
| 5 | Toluene | $4.5 \times 10^4$ | 3.0 | −30° C. |
| 6 | Toluene | $5.4 \times 10^4$ | 1.8 | −30° C. |
| 7 | Toluene | $6.8 \times 10^4$ | 2.1 | −70° C. |
| 8 | Toluene | $1.1 \times 10^5$ | 2.1 | −78° C. |
| 9 | Toluene | $1.4 \times 10^5$ | 1.8 | −78° C. |
| 10 | Toluene | $1.8 \times 10^5$ | 2.2 | −78° C. |
| 11 | Toluene | $2.1 \times 10^5$ | 2.1 | −78° C. |
| 12 | Toluene | $2.2 \times 10^5$ | 2.2 | −78° C. |

For purposes of comparison, polymerization reactions initiated solely by B(C$_6$F$_5$)$_3$ were also carried out in toluene. The polymer products exhibited lower weight average molecular weights and broader molecular weight distributions, as shown in Table 2.

TABLE 2

| Initiator | $M_w$ | $M_w/M_n$ | Temp. |
|---|---|---|---|
| Cp*TiMe$_3$/B(C$_6$F$_5$)$_3$ | $3.1 \times 10^4$ | 2.1 | −20° C. |
| Cp*TiMe$_3$/B(C$_6$F$_5$)$_3$ | $1.1 \times 10^4$ | 2.1 | −78° C. |
| Cp*TiMe$_3$/B(C$_6$F$_5$)$_3$ | $1.3 \times 10^5$ | 1.8 | −78° C. |
| B(C$_6$F$_5$)$_3$ | $6.5 \times 10^4$ | 3.2 | −20° C. |
| B(C$_6$F$_5$)$_3$ | $5.6 \times 10^4$ | 3.7 | −78° C. |
| B(C$_6$F$_5$)$_3$ | $9.8 \times 10^3$ | 6.8 | −78° C. |

The poly(iso-butylene) formed was characterized by $^1$H and $^{13}$C{$^1$H} NMR spectroscopy (benzene-d$_6$ as solvent). $^1$H NMR: $\delta$1.26 (CH$_3$), $\delta$1.59 (CH$_2$) $^{13}$C{$^1$H}NMR: $\delta$31.45 (CH$_3$), $\delta$38.2 (CH$_2$), $\delta$59.7 (tertiary C)

PRODUCTION OF COPOLYMERS OF ISOBUTYLENE WITH OTHER DIENES

Butyl rubber comprises poly iso-butylene copolymerized with approximately 1–5% by weight isoprene; other copolymers may include up to 50% isoprene or other conjugated diene.

Solvents, as noted above, were thoroughly dried, distilled and degassed. Iso-butylene was purified as above, while isoprene was dried, distilled and passed through an Aldrich inhibitor remover. Both monomers were degassed, and then transferred to a reaction flask immediately before initiation of polymerization. Polymerization was initiated by consecutive additions of the initiator - co-initiator system. The initiator concentrations were varied between 0.0056 and 0.007 M, and the molar ratio of iso-butylene to initiator co-initiator system varied between 500:1 and 1700:1 in various runs. Copolymerizations of iso-butylene and isoprene were carried out at different ratios of iso-butylene to isoprene, in toluene, at two different temperatures (−60° C. and −78° C.). On addition of the initiator and co-initiator, the reaction mixtures generally became orange-brown and viscous after 2–20 min. If the total solvent used was only 5 mL, then the polymeric product formed a solid precipitate.

Polymerizations were terminated by addition of 1% HCl in methanol and the polymers formed were washed with methanol and dried at 60° C. for 24 hours. Purification of the polymers was achieved by dissolution in $CH_2Cl_2$ and precipitation with methanol or isopropanol. After purification, the products were not generally white, as are the iso-butylene homopolymers, but slightly yellow. They were soluble in $CH_2Cl_2$, and tetrahydrofuran (THF), but insoluble in methanol and methyl ethyl ketone (MEK). The reaction products were extracted in a Soxhlet apparatus with MEK for 34 hours to remove unreacted monomers, oligomers and probably some low molecular copolymer, leaving undissolved a rubbery material of high $M_w$.

The materials obtained were characterized at room temperature by gel permation chromatography in THF, using polystyrene standards (Table 3) in accordance with conventional standards. As shown above for iso-butylene homopolymerization, values of $M_w$ and $M_w/M_n$ were both affected by the reaction temperature, consistent with the assumed carbocationic mechanism of this polymerization. The iso-butylene:isoprene ratio also had a major effect, and only for very low isoprene contents were materials having high values of $M_w$ and narrow molecular weight distributions, comparable with the iso-butylene homopolymers, obtained.

TABLE 3

| Experiment No. | Isobutylene/ Isoprene Ratio, vol % (mol %) | $M_w$ | $M_w/M_n$ | Temp |
|---|---|---|---|---|
| 1 | 30:70 (37:63) | $6.9 \times 10^3$ | 4.2 | −60° C. |
| 2 | 75:25 (72:28) | $5.4 \times 10^3$ | 1.9 | −60° C. |
| 3 | 90:10 (91:9) | $2.8 \times 10^4$ | 3.0 | −60° C. |
| 4 | 98:2 (98.5:1.5) | $1.3 \times 10^5$ | 2.2 | −78° C. |
| 5 | 99:1 (99:1)$^a$ | $1.9 \times 10^5$ | 2.2 | −78° C. |

$^a$49% Conversion.

The $^1H$ NMR spectra of the materials ($C_6D_6$) exhibited iso-butylene resonances at δ1.26 ($CH_3$) and δ1.59 ($CH_2$), as with the homopolymer (see above), as well as resonances assignable to the isoprenyl units in which isoprene incorporation into the polymer chain was primarily via 1,4-addition. $^1H$ NMR: δ5.28 (=CH), δ1.58 ($CH_2$), δ1.26 ($CH_3$). $^{13}C\{^1H\}$ NMR: ~δ132 (=C), ~δ24, ~34($CH_2$), ~δ128 (=CH), δ19.5 ($CH_3$)

On the basis of relative integrations, the proportions of isoprene in experiment no. 5 was found to be about 1%. A commercial sample of butyl rubber (Polysar, Sarnia, Ontario) exhibited an essentially identical NMR spectra.

We claim:

1. A process for producing isobutylene based polymers comprising: polymerizing isobutylene in the presence of at least $10^{-5}$ mol/L of an initiator - co-initiator system comprising compounds having the formula Cp'MXX'X" and compounds having the formula BRR'R", where Cp' is a π-bonded cyclopentadienyl or a $\eta^5$-pentamethyl substituted cyclopentadienyl ligand, M is selected from the group consisting of titanium, zirconium and hafnium, X, X' and X" are the same or different anionic ligands containing 1 to 20 nonhydrogen atoms, B is boron, and R, R' and R" are the same or different anionic groups containing 1 to 30 nonhydrogen atoms, under anhydrous, anaerobic conditions at a temperature in the range from about −100° C. to about −20° C.

2. A process as claimed in claim 1 wherein Cp' is an $\eta^5$-pentamethylcyclopentadienyl group covalently bonded to M.

3. A process as claimed in claim 1 wherein X, X' and X" are selected from the group consisting of alkyl, aryl, alkoxy, carboxy, groups containing 1-6 carbon atoms and halo and R, R' and R" are selected from the group consisting of haloaryl groups containing 6-10 carbon atoms.

4. A process as claimed in claim 3 wherein M is titanium; X, X' and X" are the same or different alkyl groups containing 1-4 carbon atoms and R, R' and R" are the same or different halophenyl groups.

5. A process as claimed in claim 1 wherein equal molar amounts of initiator and co-initiator are dissolved in an organic solvent.

6. A process as claimed in claim 5 wherein said solvent is selected from the group consisting of toluene and methylene dichloride.

7. A process for producing butyl rubber comprising: copolymerizing selected proportions of isobutylene and a conjugated diene monomer in the presence of at least $10^{-5}$ mol/L of an initiator - co-initiator system comprising compounds having the formula Cp'MXX'X", and compounds having the formula BRR'R", where Cp' is a π-bonded cyclopentadienyl or a $\eta^5$-pentamethyl substituted cyclopentadienyl ligand, covalently bonded to M, where M is selected from the group consisting of titanium, zirconium and hafnium, X, X' and X" are the same or different anionic ligands containing 1 to 20 nonhydrogen atoms, B is boron and RR' and R" are the same or different anionic groups containing 1 to 30 nonhydrogen atoms, under anearobic conditions at a temperature in the range from about −100° C. to about −20° C.

8. A process as claimed in claim 7 wherein Cp' is an $\eta^5$-pentamethylcyclopentadienyl group covalently bonded to M.

9. A process as claimed in claim 7 wherein X, X' and X" are selected from the group consisting of alkyl, alkoxy, carboxy groups containing 1-6 carbon atoms, halo and aryl groups containing 6-20 carbon atoms and R, R' and R" are selected from the group consisting of haloaryl and substituted haloaryl groups containing 6-10 carbon atoms.

10. A process as claimed in claim 10 wherein M is titanium; X, X' and X" are the same or different alkyl groups containing 1-4 carbon atoms and R, R' and R" are the same or different halophenyl groups.

11. A process as claimed in claim 10 wherein said alkyl groups are methyl and said halophenyl groups are $C_6F_5$.

12. A process as claimed in claim 11 wherein said co-initiator is $B(C_6F_5)_3$.

13. A process as claimed in claim 7 wherein equal molar amounts of said initiator and co-initiator compounds are dissolved in an organic solvent.

14. A process as claimed in claim 13 wherein said solvent is selected from the group consisting of toluene and methylene dichloride.

15. A process as claimed in claim 7, wherein the conjugated diene monomer is isoprene.

* * * * *